United States Patent [19]
Singleterry et al.

[11] Patent Number: 5,642,991
[45] Date of Patent: Jul. 1, 1997

[54] SLIDING VANE PUMP WITH PLASTIC HOUSING

[75] Inventors: Ronald Clinton Singleterry, Bell Buckle; William M. Larson, Murfreesboro, both of Tenn.

[73] Assignee: Procon Products, Murfreesboro, Ind.

[21] Appl. No.: 614,318

[22] Filed: Mar. 11, 1996

[51] Int. Cl.⁶ .............. F04C 2/344; F04C 15/00; F16L 39/02
[52] U.S. Cl. .............. 418/104; 418/132; 418/133; 418/152; 418/181; 285/91
[58] Field of Search .............. 418/132, 133, 418/152, 181, 104; 285/26, 29, 91, 137.1, 305

[56] References Cited

U.S. PATENT DOCUMENTS

| | | | |
|---|---|---|---|
| 2,535,016 | 12/1950 | Launder | 285/305 |
| 2,677,330 | 5/1954 | Rosaen | 418/268 |
| 2,739,539 | 3/1956 | Gardiner | 418/133 |
| 2,853,023 | 9/1958 | English | 418/133 |
| 2,925,786 | 2/1960 | Hill | 418/152 |
| 3,162,141 | 12/1964 | Vlachos | 418/268 |
| 3,311,064 | 3/1967 | Eichele et al. | 418/133 |
| 3,574,493 | 4/1971 | Hamilton | 418/268 |
| 3,645,654 | 2/1972 | Niemiec et al. | 418/133 |
| 3,826,589 | 7/1974 | Frank et al. | 415/201 |
| 3,834,846 | 9/1974 | Linder et al. | 418/133 |
| 4,076,791 | 2/1978 | Barter et al. | 264/272 |
| 4,337,574 | 7/1982 | Hughes et al. | 29/883 |
| 4,468,054 | 8/1984 | Orth | 285/137.1 |
| 4,543,228 | 9/1985 | Bingler | 264/275 |
| 4,722,652 | 2/1988 | Jingin et al. | 418/268 |
| 5,297,820 | 3/1994 | Martin | 285/137.1 |

FOREIGN PATENT DOCUMENTS

| | | | |
|---|---|---|---|
| 328056 | 4/1930 | United Kingdom | 285/137.1 |
| 1581524 | 12/1980 | United Kingdom | 418/152 |
| 2068490 | 8/1981 | United Kingdom | 285/137.1 |

Primary Examiner—John J. Vrablik
Attorney, Agent, or Firm—Luedeka, Neely & Graham, P.C.

[57] ABSTRACT

A moderately high pressure, sliding vane pump is fabricated from low modulus plastic by routing high pressure fluid away from the central pump perimeter and into a bearing gland chamber for discharge porting. Port fittings are push socket connections that are sealed by O-rings and held in place against fluid pressure ejection by a saddle plate that cross-pins to the port boss.

27 Claims, 5 Drawing Sheets

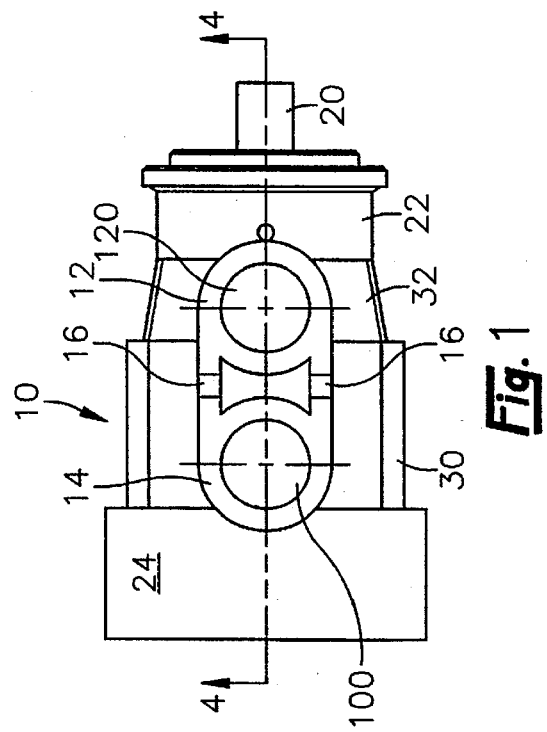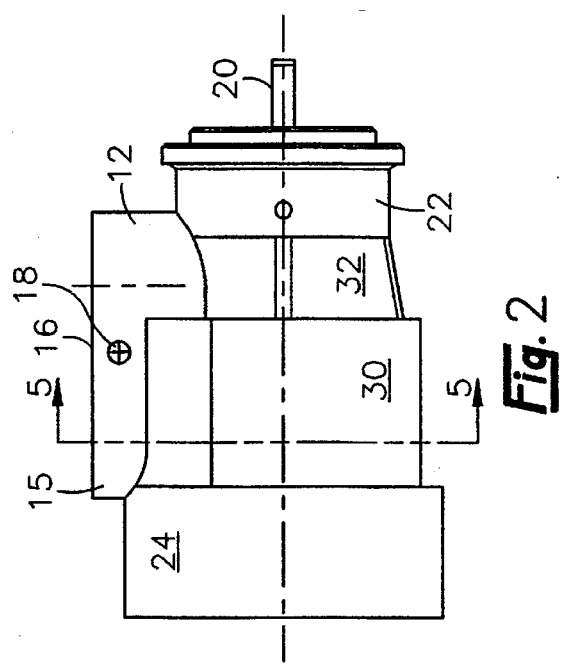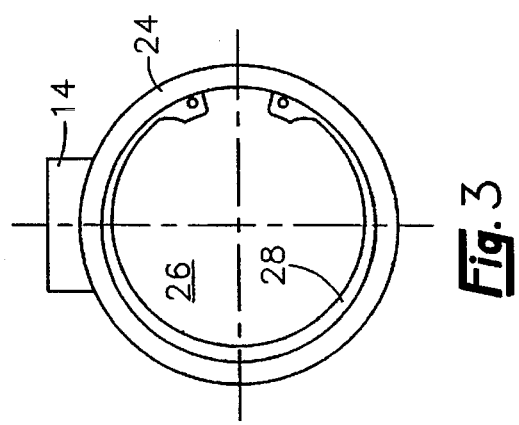

1

SLIDING VANE PUMP WITH PLASTIC HOUSING

BACKGROUND OF THE INVENTION

The present invention relates to sliding vane pumps. More particularly, the invention relates to a moderately high pressure sliding vane pump having a non-metallic housing.

For the reliable delivery of moderately high pressure fluids at modest cost, the sliding vane pump is the standard of industry. Having relatively few moving parts, the machine will continuously deliver a spectrum of fluids from water to oil up to 250 psi for long operational periods.

Traditionally, many sliding vane pump housings are finish machined from forged or cast brass or stainless steel. The brass alloy for these blanks includes 1% to 2% lead to reduce machine tool fouling and improve forgability. However, when these leaded brass pump housings are used to move potable water, over time lead will leach from the brass alloy into the water. Although the leaching rate is not great, it is nevertheless measurable and by some, considered intolerable for potable fluid use.

In a relative sense, sliding vane pump housings are simple and may be formed from numerous soft castable materials such as high density polymers. U.S. Pat. No. 4,543,228 to D. J. Bingler is representative of a molded plastic housing for a sliding vane pump. The Bingler plastic housing design is also typical in that the Bingler design translates the prior art brass housing configuration directly into the plastic housing configuration. Unfortunately, the plastic modulus of elasticity, G, approximately 1.5 to $2.0 \times 10^6$ lb./in$^2$ is considerably less than the leaded brass modulus of about $15.0 \times 10^6$ lb./in$^2$. As a consequence, the plastic housing perimeter tends to expand more under the same pressure as compared to brass thereby inducing considerably more leakage and flow loss. The resulting plastic housed pump must be pressure derated considerably and the efficiency suffers from the flow loss.

It is an object of the present invention, therefore, to provide an efficient sliding vane pump having a non-metallic housing.

Another object of the invention is a relatively high pressure pump having a plastic housing.

Yet another object of the invention is a sliding vane pump that will not leach heavy metals into potable fluids.

A still further object of the invention is a connector system for conduits to a polymer pump boss having no threads.

Still another object of the invention is a non-metallic connector system for securing fluid carrier conduits to a nonmetallic pump boss having no threads.

SUMMARY OF THE INVENTION

These and other objects of the invention will be apparent from the following description of the preferred invention embodiment which comprises a sliding vane pump having a vane rotor cartridge seated in a relatively low/modulus, non-metallic material housing cavity such as glass fiber reinforced polyphenylene sulfide or polyphthalamide resin. Assembled with the cartridge as a unit are the pump rotor and vanes having an attached drive shaft. The drive shaft is axially unitized with the rotor which is supported by axially flanking bearing plates. In a first embodiment of the invention, the pump rotor assembly is closed within the cavity by an end-plug secured by a C-ring. The end-plug edge perimeter is sealed to the housing internal bore wall by a first O-ring and against the outer face of the base side bearing plate by a second O-ring. Radially surrounding the rotor is a pump cam ring. The cam ring and bearing plates fit tightly within a non-metallic injection molded housing cavity to dispose the drive shaft through a radial support bearing. A spring loaded rotor face seal is disposed in a high pressure seal cavity between the shaft bearing and the pump rotor assembly. In this first invention embodiment, high pressure discharge fluid from the high pressure pump chamber is channeled into this shaft bearing seal cavity and away from the cam ring perimeter. The high pressure fluid is ported from the shaft bearing seal cavity. Seals between the rotor cartridge and the non-metallic housing walls isolate that portion of the housing surrounding the rotor from high pressure expansive stress.

Another embodiment of the invention, provides for high pressure discharge fluid to be channeled from the high pressure pump chamber into a small, high pressure cavity on the side of the rotor assembly opposite from the drive shaft connection. The housing end-plug is structurally reinforced with a fitting support boss to provide a high pressure fluid discharge port from the high pressure cavity between the end-plug and the rotor assembly.

The external conduit connectors are threadless plug and socket fittings sealed by an O-ring. The plugs are held in the sockets against fluid expulsion pressure by a saddle bracket pinned to the pump housing. C-clips in the saddle bight section engage an external ring groove in the plug connector body.

BRIEF DESCRIPTION OF THE DRAWINGS

Other objects of the invention will become apparent by reference to the following detailed description taken in connection with the accompanying drawings, in which:

FIG. 1 is a top plan view of the invention;

FIG. 2 is a side elevational view of the invention;

FIG. 3 is an end elevational view of the invention;

DESCRIPTION OF THE PREFERRED EMBODIMENT

Figure 4:
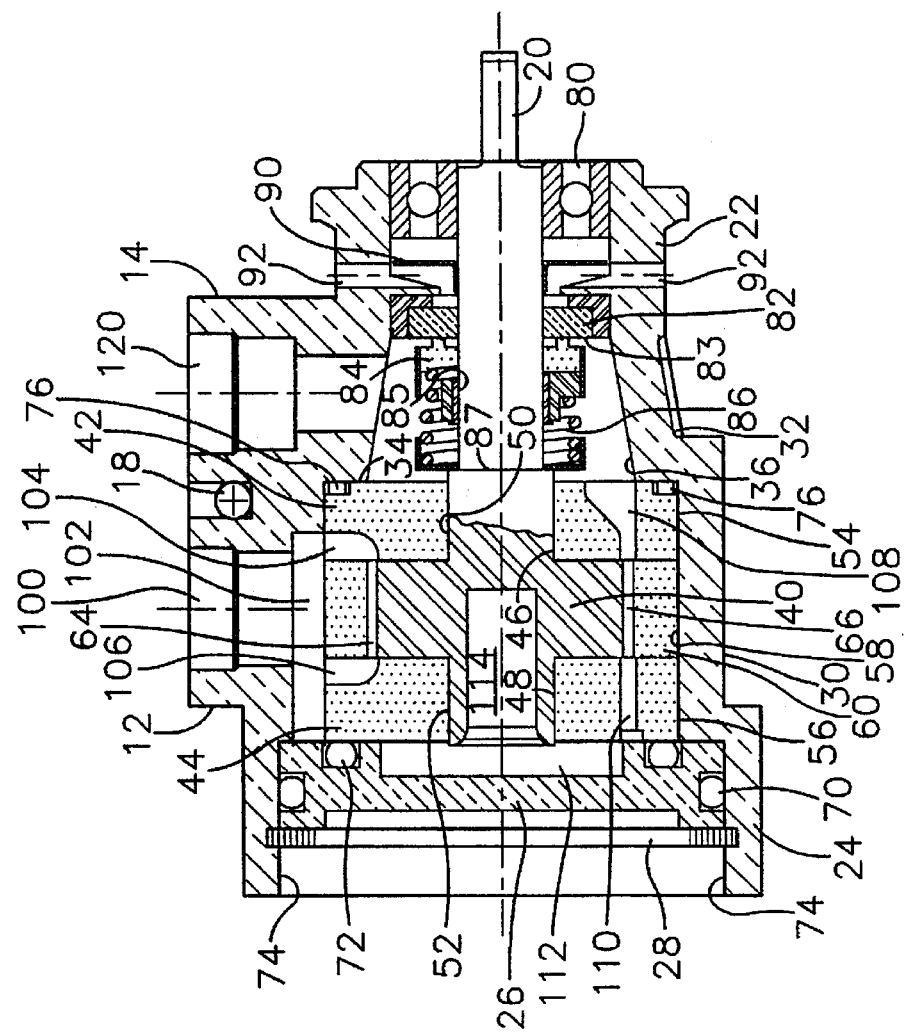
FIG. 4 is a sectioned elevation of the invention viewed along cutting plane 4—4 of FIG. 1.

Relative to the drawing wherein like reference characters designate like or similar elements throughout the several figures of the drawing, the present invention is illustrated by the three orthographic views of FIG. 1, FIG. 2 and FIG. 3. Generally, the pump housing 10 materially comprises an injection molded form of glass fiber reinforced polymer resin such as polyphenylene sulfide or polyphthalamide. Representative is the proprietary material Ryton® supplied by the Phillips 66 Company of Bartlesville, Okla. Ryton® is a composite having about 40% glass fiber in a polyphenylene sulfide binder. Among its material properties are a modulus of elasticity of $1.9 \times 10^6$ lb./in$^2$.

Another suitable material, supplied by Amoco Polymers of Alpharetta, Ga., is AMODEL®, a composite of polyphthalamide and glass fiber. A 33% glass fiber composition of AMODEL is reported to have a $1.6 \times 10^6$ lb./in$^2$ modulus of elasticity whereas a 45% glass fiber composition has a $2.0 \times 10^6$ lb./in. modulus.

Due to the presence of glass fiber in these polymer compositions, components designed for direct contact with a potable fluid are finish formed by injection molding. Post-molding machine processes are undesirable.

With respect to our housing 10 design using Ryton® or AMODEL®, a pump cartridge ring 30 is positioned axially between a bearing ring 22 and a base ring 24. Between the bearing ring 22 and the pump cartridge ring 30 is a conically shaped bearing seal chamber 32. Each of the housing ring sections have cylindrical internal chambers of diminishing radius from base ring 24 to bearing ring 22 to facilitate assembly of the pump rotating elements. A cartridge rotor drive shaft 20 protrudes axially from the bearing ring 22 end of the housing. The base ring 24 external opening is sealed by an end-plug 26 secured by a C-ring 28.

Internally molded with the ring and seal chamber elements of the housing 10 are intake and discharge port bosses 12 and 14, respectively, connected by webs 16. Two axially aligned pin apertures 18 pass through the webs 16 having a purpose in the overall invention to be explained hereafter.

Figure 5:
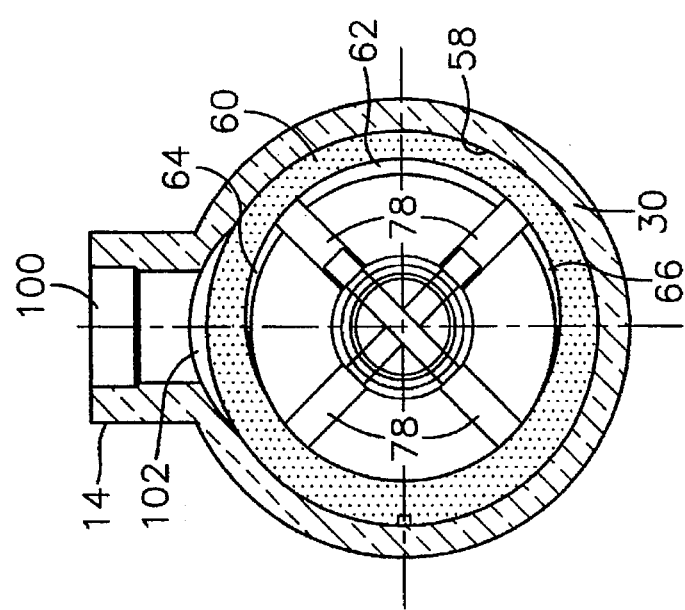
FIG. 5 is a sectioned elevation of the invention viewed along cutting plane 5—5 of FIG. 2.
Figure 6:
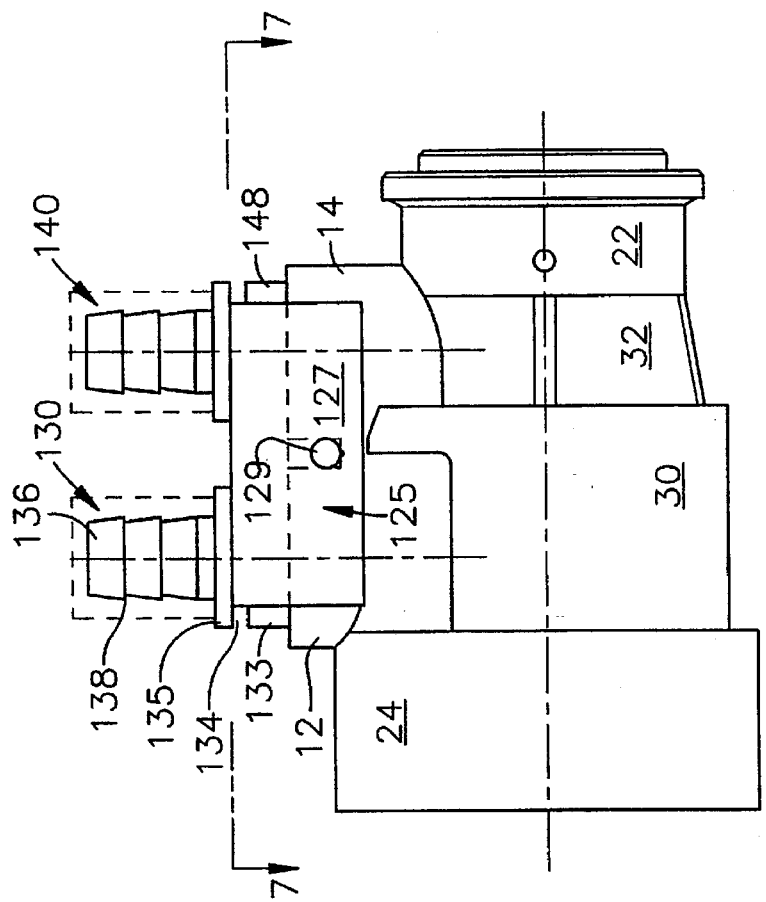
FIG. 6 is a side elevational view of the invention with port fittings.

Referring next to the sectional views of FIGS. 4 and 5, the pump cartridge assembly includes a rotor element 40 directly driven by an integral drive shaft 20. Journal walls 42 and 44 include journal bearings 46 and 48 to relatively confine the rotor element 40 radially about the journal pin surfaces 50 and 52. The outer perimeters 54 and 56 of the journal walls are match fits to the internal cartridge chamber wall 58. The interior journal wall 42 includes an O-ring face seal 76 for a fluid pressure barrier against the step face 34 between the cartridge chamber wall 58 and the internal wall surface 36 of the bearing seal chamber 32.

In compressed assembly between the journal walls 42 and 44 around the rotor 40 is a cam ring 60 with an eccentrically aligned pumping crescent 62. The internal surface of the cam ring 60 radially confines the outwardly biased fluid drive vanes 78 as fluid is swept in front of the vanes from the low pressure, inlet portion 64 of the pumping crescent to the high pressure, discharge portion 66. The fluid drive vanes make a sliding, pressure sealed interface with the cam ring 60 that is resiliently biased by the summation of high pressure fluid loads and centrifugal loads.

O-rings 70 and 72, set in the outer rim and interior face of the base plug 26, provide a fluid pressure seal against the internal bore wall 74 of the housing base ring 24 and the outer face of base side journal wall 44.

The drive end of the drive shaft 20 is radially supported within the housing by a shaft roller or ball bearing assembly 80. A rotating fluid seal assembly around the shaft comprises a stator 82 having a pressurized fluid seal fit within the static structure of the bearing seal chamber 32 and a smooth, low friction seal face 83. Cooperating with the seal face 83 is a sealing rotor 84 that translates axially along a small increment of the shaft 20 but is pressure sealed to the shaft 20 surface by an elastomer boot 85. A seal loading spring 86 seats between seal rotor 84 and a shaft shoulder 87 to preload the sealing interface between the rotor 84 and the seal face 83.

On the exterior side of the seal stator 82 and secured to the shaft 20 for rotation therewith is a slinger ring 90. Vent or drain aperture 92 through the bearing ring 20 provides internal drainage to channel the pumped fluid that may escape past the rotor seal 84 away from the bearing assembly 80.

Dynamically, fluid enters the intake port 100 to flood the suction plenum 102. By channels 104 and 106 in the journal walls 42 and 44, respectively, the fluid floods the inlet portion 64 of the pumping crescent 62 in front of a rotatively advancing vane 78. Continued rotation of the vane 78 drives an increment of fluid around the crescent 62 into the discharge portion 66.

From the crescent discharge section 66, the fluid is forced by the advancing vane face into channels 108 and 110 respective to the drive side journal wall 42 and the base side journal wall 44. Hollows 112 and 114 respective to the end plug 26 and the rotor 40 transmit the high pressure fluid of discharge section 66 to the underside of vanes 78 as a source of a radial biasing force. The high pressure force also bears against the outer face of base side journal wall 44 within the seals 72 to bias that element inwardly.

In the preferred embodiment of FIGS. 1–5, channel 108 transmits the majority flow of fluid across the drive side journal wall 42 into the interior of bearing seal chamber 32 and, ultimately, out the discharge port 120. Fluid pressure within the chamber 32 exerts force against the drive side journal wall 42 and the seal rotor 84.

Figure 10:
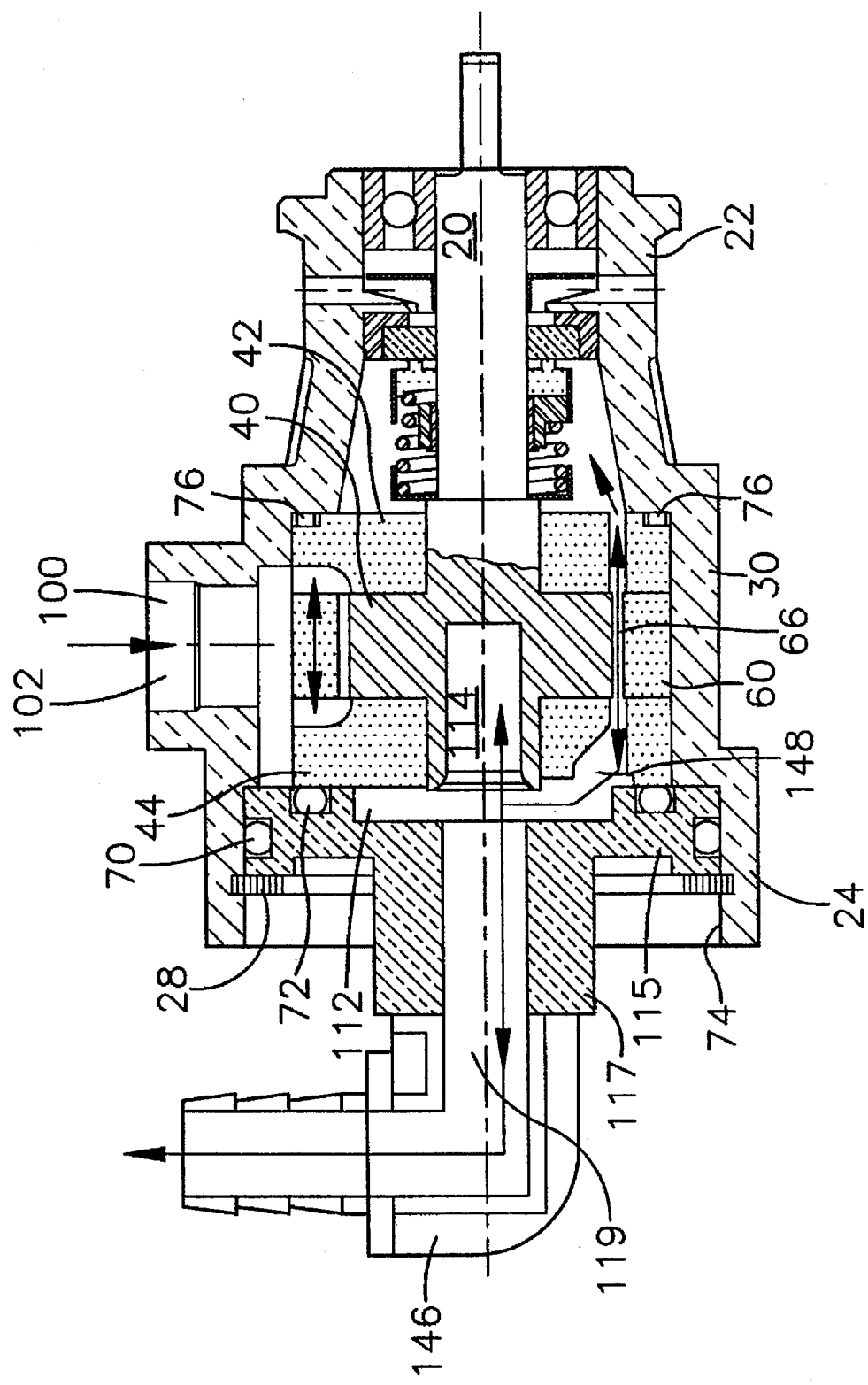

An alternate embodiment of the invention shown by FIG. 10 provides for a majority of the high pressure fluid flow from the pumping crescent discharge section 66 to flow across the base side wall journal 44 through channel 148 into the chamber 112 between an end-plug 115 and the base side journal wall 44. The end-plug 115 of this embodiment is structurally reinforced with a conduit connector fitting support boss 117. High pressure fluid discharge follows an axial flow channel 119 from end chamber 112, through the boss 117, into a conduit connector fitting 146.

It is to be noted that the location of O-ring face seals 76 and 72 bearing against the outer faces of journal walls 42 and 44 near the respective outer rims isolate the radial perimeter of the cartridge ring 30 from high fluid pressure generated by the pump. Only the low, inlet fluid pressure in plenum 102 directly contacts the internal cartridge wall 58. Journal walls 42 and 44 partition the suction plenum 102 from the high discharge pressure standing at both axial ends of the cartridge assembly. Accordingly, the dominant high pressure stress on the housing is exerted axially except for that within the bearing seal chamber 32 which is of reduced axial section area. Consequently the total tensile hoop stress distributed around the walls of the bearing chamber 36 and bearing ring 22 may be reduced due to the smaller diameter apertures in this area. Such reduced stress values are compatible with the polymer housing material.

As a further consequence of the small diameter apertures of the present invention, the walls of bearing chamber 36 are also the stiffest in the pump. Although there is more radial deflection of the chamber walls with polymer vs brass, such deflection is of little consequence because: the deflection values are low and within elastic limits; there is no performance leakage or flow loss potential in the bearing chamber section; and, there are no end leakage concerns since the polymer cooperates with the shaft stator to provide a resilient seal. Hence, the invention positions the highest internal pressures of the pump in chambers having the lowest hoop stress and greatest radial stiffness.

Figure 8:
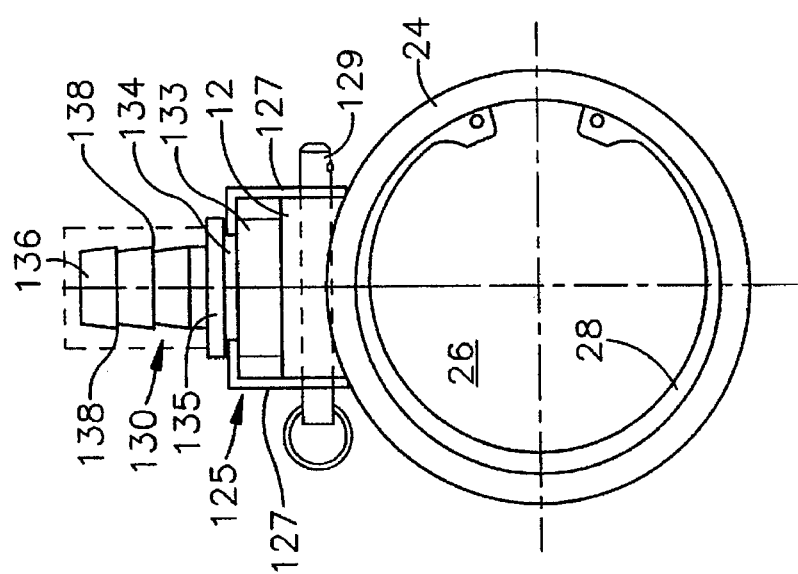
FIG. 8 is an end elevational view of the invention with port fittings.
Figure 7:
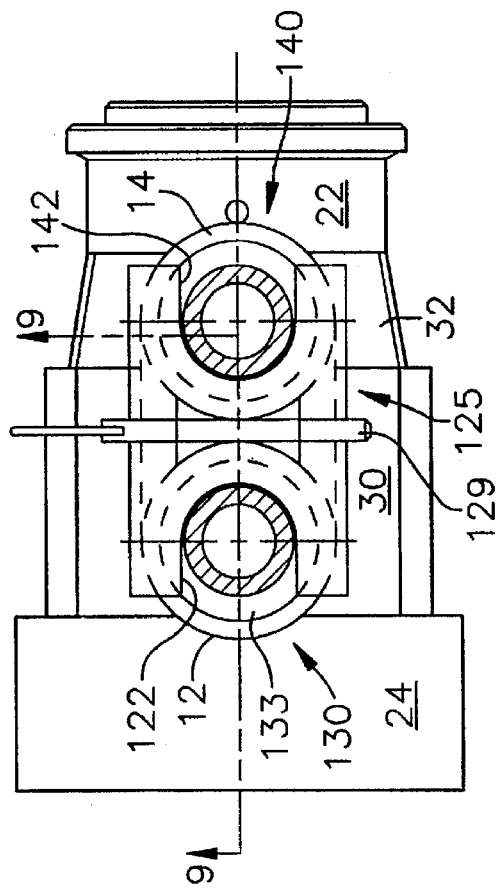
FIG. 7 is a sectioned plan view of the invention viewed along cutting plane 7—7 of FIG. 6.
Figure 9:
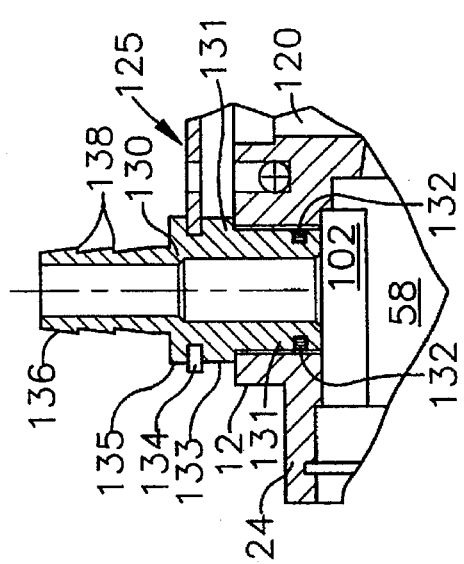
FIG. 9 is a sectioned detail of a port fitting viewed along cutting plane 9—9 of FIG. 7; and, FIG. 10 is a sectioned elevation of an alternate embodiment of the invention.

To overcome excessive shear stress on conduit connector threads in the plastic port bosses, a threadless connector system as described with respect to the invention embodiment of FIGS. 7–9 is applied with the present invention. The internal bores of intake and discharge ports 100 and 120, respectively, are smooth to receive male connector plugs 130 and 140, respectively. O-rings 132 seal the circular interface between the plug sealing cylinder wall 131 and the internal socket wall of boss 12.

In the axial mid-section of the plug 130 (and the identical mate 140) are a pair of circumferential shoulders 133 and 135 separated by a circumferential ring groove 134.

On the axial end of the plug opposite from the sealing cylinder 131 is a conduit connection structure shown by FIGS. 6–9 as a hose nib 136 with circumferential ratchet barbs 138. An alternative conduit connection structure may be threads, whether pipe or machine.

To secure the connector plugs 130 and 140 against expulsion from the sockets of ports 100 and 120 due to fluid pressure forces, oppositely facing yokes 122 and 142 in the bight plate of a saddle bracket 125 mesh with the circumferential grooves 134 in the plugs 130 and 140. The saddle bracket legs 127 straddle the port boss webs 16. A transverse linchpin 129 passes through aligned apertures in both, the webs 16 and bracket legs 127.

Recommended assembly of the connector elements would normally begin with a clamp secured connection of the nibs 136 into respective hose bores. With the hoses secured, the circumferential ring grooves 134 respective to the two connectors are meshed with the bight yokes 122 and 142 and manually held together while the connector plugs are inserted into respective port sockets 100 and 120. With all elements aligned and in place, the linchpin 125 is aligned with all central apertures and inserted to interlock the several elements together.

Having fully disclosed our invention, those of ordinary skill in the art will note other approaches to the same objective and devise equivalent structures to accomplish such objectives. As our invention, therefore,

We claim:

1. A sliding vane pump having a housing and a cartridge assembly enclosed by said housing, said cartridge assembly comprising a plurality of vane elements confined to radial displacement within a rotor body, said radial displacement of said vane elements being biased outwardly from a rotor body rotational axis and against a stationary cam ring having external and internal perimeter surfaces whereby distal ends of said vane elements slidably engage the internal perimeter surface of said cam ring, said vane confining rotor body and cam ring being confined axially between stationary partition walls, a fluid inlet port opening through said housing to the interior surface of said cam ring, discharge flow channels through at least one of said partition walls to release discharge fluid flow from said cam ring interior surface into a discharge chamber within said housing that is axially displaced from said cartridge assembly, a drive shaft secured at one end thereof to said rotor body and extending from said rotor body along a respective rotational axis that is coaxial with said rotor body rotational axis, the extension of said drive shaft from said rotor body passing through discharge chamber and an aperture in said housing, and pressure sealing means secured to said drive shaft to seal said aperture with the force of fluid pressure in said discharge chamber.

2. A sliding vane pump as described by claim 1 wherein said partition walls isolate discharge fluid from the external perimeter surface of said cam ring.

3. A sliding vane pump as described by claim 2 wherein said cam ring external surface interfaces with an internal seating surface of said housing.

4. A sliding vane pump as described by claim 3 wherein said housing is formed of a non-metallic material.

5. A sliding vane pump as described by claim 2 wherein a fluid discharge port includes an opening through said housing into said discharge chamber.

6. A sliding vane pump as described by claim 5 wherein said pressure sealing means comprises a resiliently biased rotor face seal.

7. A sliding vane pump as described by claim 2 wherein said discharge flow channels are provided through said partition walls to additionally release discharge fluid flow into an end-plug chamber on a side of said rotor body opposite from said drive shaft extension.

8. A sliding vane pump having a rotor element supported for rotation about a rotor axis, said rotor element having a plurality of fluid displacement vanes combined within said rotor element for radial movement relative to said rotor axis, a stationary cam ring having an internal perimeter surface and external perimeter surface encompassing said rotor element and vanes, said vanes being biased away from said rotor axis to slidably engage the internal perimeter surface of said cam ring, the external perimeter surface of said cam ring at least partially engaging wall elements of a housing that enclose said cam ring and rotor element, a pair of axially separated partition walls disposed transversely of said rotor axis and confining between them said rotor element and cam ring, an inlet port through the housing wall elements to channel fluid into a suction chamber between said cam ring internal perimeter surface and said rotor element, said suction chamber being swept by said fluid displacement vanes to displace fluid therein about said cam ring internal perimeter surface to a discharge chamber between said internal perimeter surface and said rotor element, at least one of said partition walls being perforated in the proximity of said discharge chamber to pass fluid therefrom into a fluid discharge cavity positioned within said housing wall elements but axially outside of the separated partition walls, a discharge port from said fluid discharge cavity whereby fluid displaced by the rotation of said vanes within said internal perimeter surface is removed from said cavity, and a rotor element drive shaft extended coaxially with said rotor axis through said fluid discharge cavity and through an aperture in said housing wall elements, said aperture being sealed from fluid discharge cavity pressure loss by sealing means that is secured to and rotates with said drive shaft.

9. A sliding vane pump as described by claim 8 wherein said pair of partition walls include bearings to rotatively confine and support said rotor element within said housing wall elements.

10. A sliding vane pump as described by claim 9 wherein said sealing means comprises a resiliently biased rotor face seal.

11. A sliding vane pump as described by claim 10 wherein said housing wall elements are formed of a non-metallic material.

12. A sliding vane pump as described by claim 9 wherein said partition walls isolate said suction chamber from the fluid pressure of said discharge chamber.

13. A sliding vane pump as described by claim 12 wherein said inlet port through said housing wall elements opens into an antechamber adjacent a portion of the cam ring external perimeter surface.

14. A sliding vane pump as described by claim 11 wherein said inlet and discharge ports through said housing wall elements are connector receptacles having substantially smooth cylindrical walls.

15. A sliding vane pump as described by claim 14 wherein connector fittings transition fluid flow through said ports from and into external conduits.

16. A sliding vane pump as described by claim 15 wherein said connector fittings have substantially smooth wall cylindrical plugs for sealingly penetrating said connector receptacles.

17. A sliding vane pump as described by claim 16 wherein a circular interface between a smooth cylindrical wall plug and a connector receptacle wall is sealed against the passage of pressurized fluid by an elastomer O-ring.

18. A sliding vane pump as described by claim 17 wherein a connector fitting is secured in a receptacle penetrating position by a saddle bracket that is anchored to said housing.

19. A sliding vane pump as described by claim 18 wherein said connector fitting includes a ring groove for slidably receiving a C-clip in said saddle bracket.

20. A sliding vane pump as described by claim 19 wherein connector fittings respective to both inlet and discharge fluid flow channels are secured by a single saddle bracket having a pair of oppositely opening C-clips.

21. A sliding vane pump as described by claim 11 wherein said non-metallic housing wall elements are a composite material having a polymer binder.

22. A sliding vane pump as described by claim 21 wherein said housing wall elements are a composite of glass fiber and polyphenylene sulfide.

23. A sliding vane pump as described by claim 21 wherein said housing wall elements are a composite of glass fiber and polyphthalamide.

24. A sliding vane pump as described by claim 8 wherein said partition walls are perforated in the proximity of said discharge chamber to also pass fluid therefrom into an end-plug chamber portion of said discharge cavity on a side of said rotor element opposite from said rotor element drive shaft whereby said discharge port removes fluid from said discharge cavity through said end-plug chamber.

25. A threadless connector assembly for operatively connecting a pressurized fluid conduit to a fluid appliance, said appliance having a fluid connector receptacle with a threadless, substantially smooth and straight internal wall surface to receive a compatible connector plug, said connector assembly comprising a fluid connector having an external cylindrical plug portion at one axial end, fluid conduit connection means at an opposite axial end, a fluid flow channel axially through said connector between said plug portion and said conduit connection means end, and an external ring groove between said plug portion and said conduit connection means, said plug portion having a substantially smooth, external cylinder wall for penetrating said appliance receptacle; bracket means for preventing the fluid pressure ejection of said fluid connector from said receptacle, said bracket means comprising a saddle formed by a pair of leg sections flanking a bight section, C-clip means formed in said bight section to engage said fluid connector external ring groove; and threadless fastener means engaging both said bracket means and said appliance to structurally secure said bracket means to said appliance.

26. A connector assembly as described by claim 25 wherein said bight section of paid C-clip means comprises a pair of oppositely oriented, substantially C-shaped, openings for engaging said external ring groove portion of said fluid connector.

27. A connector assembly as described by claim 25 wherein said threadless fastener means comprises a pin passing through said saddle leg sections and a portion of said appliance.

\* \* \* \* \*

UNITED STATES PATENT AND TRADEMARK OFFICE
CERTIFICATE OF CORRECTION

PATENT NO. : 5,642,991
DATED : July 1, 1997
INVENTOR(S) : Ronald Clinton Singleterry and William M. Larson It is certified that error appears in the above-indentified patent and that said Letters Patent is hereby corrected as shown below:

Column 8, line 24, delete "paid" and insert --said--.

Signed and Sealed this

Twenty-first Day of October 1997

Attest:

BRUCE LEHMAN

Attesting Officer

Commissioner of Patents and Trademarks